(12) United States Patent
Hicks et al.

(10) Patent No.: US 11,814,899 B2
(45) Date of Patent: Nov. 14, 2023

(54) LADDER SECURING DEVICE

(71) Applicants: Heath Hicks, Tyler, TX (US); Eric Mackintosh, Tyler, TX (US)

(72) Inventors: Heath Hicks, Tyler, TX (US); Eric Mackintosh, Tyler, TX (US)

( * ) Notice: Subject to any disclaimer, the term of this patent is extended or adjusted under 35 U.S.C. 154(b) by 724 days.

(21) Appl. No.: 16/825,698

(22) Filed: Mar. 20, 2020

(65) Prior Publication Data

US 2021/0293090 A1 Sep. 23, 2021

(51) Int. Cl.
| | |
|---|---|
| *E06C 7/48* | (2006.01) |
| *E06C 1/34* | (2006.01) |
| *E06C 7/18* | (2006.01) |
| *B25J 1/04* | (2006.01) |
| *F16M 13/02* | (2006.01) |

(52) U.S. Cl.
CPC ............... *E06C 7/486* (2013.01); *E06C 1/34* (2013.01); *E06C 7/188* (2013.01); *E06C 7/48* (2013.01); *B25J 1/04* (2013.01); *F16M 13/02* (2013.01)

(58) Field of Classification Search
CPC . E06C 7/486; E06C 1/34; E06C 7/188; E06C 7/48; B25B 9/00; B25J 1/04; F16M 13/02
USPC ........................................................ 182/107
See application file for complete search history.

(56) References Cited

U.S. PATENT DOCUMENTS

| | | | |
|---|---|---|---|
| 1,543,551 A * | 6/1925 | Couche ..................... | E06C 7/48 182/214 |
| 2,072,415 A | 3/1937 | Abbitt | |
| 2,271,081 A | 1/1942 | Layton | |
| 2,583,422 A | 1/1952 | Haddon | |
| 2,674,961 A | 4/1954 | Lake | |
| 2,693,195 A | 11/1954 | Frieder et al. | |
| 3,023,544 A | 3/1962 | Hughes | |
| 3,295,264 A | 1/1967 | Olson | |
| 3,352,581 A | 11/1967 | Robbins et al. | |
| 3,367,070 A | 2/1968 | Mitchell | |
| 3,913,284 A | 10/1975 | Hall | |
| 4,067,347 A | 1/1978 | Lipinski | |
| 4,077,595 A * | 3/1978 | Carter ....................... | E06C 7/14 248/210 |
| 4,089,127 A | 5/1978 | Maijala | |
| 4,090,587 A * | 5/1978 | Pyle .......................... | E06C 1/34 182/206 |
| 4,173,101 A | 11/1979 | Van Wingerden | |
| 4,190,988 A | 3/1980 | Carreiro | |
| 4,190,998 A | 3/1980 | Keith | |
| 4,387,533 A | 6/1983 | Green et al. | |

(Continued)

FOREIGN PATENT DOCUMENTS

| | | | | |
|---|---|---|---|---|
| AU | 2001100506 A4 * | 11/2001 | ............. | E06C 7/486 |
| AU | 2018213985 A1 * | 2/2020 | ............... | E06C 1/34 |

(Continued)

*Primary Examiner* — Taylor Morris
(74) *Attorney, Agent, or Firm* — Standley Law Group LLP; F. Michael Speed; Adam J. Smith

(57) ABSTRACT

Systems and methods for securing a ladder to a gutter are disclosed. An insert includes a first portion configured to fit within an opening for the gutter and a second portion configured to form a channel configured to receive a front surface of the gutter. A number of arms extend from the second portion. The arms are selectively deformable into a number of positions, and may be wrapped around side rails of the ladder.

15 Claims, 16 Drawing Sheets

(56) References Cited

U.S. PATENT DOCUMENTS

| | | | |
|---|---|---|---|
| 4,406,093 A | 9/1983 | Good et al. | |
| 4,435,925 A | 3/1984 | Jefferys | |
| 4,445,301 A | 5/1984 | Tanski | |
| 4,596,093 A | 6/1986 | Esposito | |
| 4,714,136 A * | 12/1987 | Morin | E06C 7/486 248/210 |
| 4,878,322 A | 11/1989 | Ikeda et al. | |
| 4,915,439 A | 4/1990 | Cramaro | |
| 5,010,696 A | 4/1991 | Knittel | |
| 5,038,517 A | 8/1991 | Talbott | |
| 5,083,388 A | 1/1992 | Cooley | |
| 5,092,086 A | 3/1992 | Rognsvoog, Sr. | |
| 5,197,238 A | 3/1993 | Peleg | |
| 5,207,033 A | 5/1993 | Sells | |
| 5,268,969 A | 12/1993 | Duran, Jr. | |
| 5,410,844 A | 5/1995 | Lynch | |
| 5,484,036 A * | 1/1996 | Cothern | E06C 7/48 182/214 |
| 5,564,234 A | 10/1996 | Vermeulen | |
| 5,640,810 A | 6/1997 | Pietersen | |
| 5,752,347 A * | 5/1998 | Osborn | E04D 13/076 52/12 |
| 5,823,590 A * | 10/1998 | Forrest | B25J 1/04 294/24 |
| 5,864,990 A | 2/1999 | Tu | |
| 6,098,345 A | 8/2000 | Demartini et al. | |
| 6,113,340 A | 9/2000 | Zalal | |
| 6,347,780 B1 * | 2/2002 | Holbrook | F21S 4/10 248/48.1 |
| 6,354,401 B2 * | 3/2002 | Murray | E06C 1/34 248/48.1 |
| 6,473,953 B1 * | 11/2002 | Portnoff | B25J 1/04 29/241 |
| 6,493,994 B1 | 12/2002 | Lucas | |
| 6,550,577 B1 * | 4/2003 | Allgire | E06C 1/34 248/500 |
| 6,640,502 B2 | 11/2003 | Mueller | |
| 6,688,045 B1 | 2/2004 | Pilcher | |
| 6,729,441 B1 * | 5/2004 | Nahlen | E06C 7/48 182/206 |
| 6,843,019 B2 | 1/2005 | Mercurio et al. | |
| 6,877,400 B2 * | 4/2005 | Weaver | B25B 9/00 269/6 |
| 7,192,069 B1 * | 3/2007 | Daniel | A63C 11/025 294/147 |
| 7,240,458 B2 | 7/2007 | Ishisaki | |
| 7,303,687 B2 | 12/2007 | Groth et al. | |
| 7,488,018 B2 * | 2/2009 | Rommelmann, Jr. | E04D 13/064 248/48.2 |
| 7,581,356 B1 | 9/2009 | Balkum et al. | |
| 8,042,562 B1 | 10/2011 | McDaniel, Jr. | |
| 8,069,617 B2 | 12/2011 | Wootton | |
| 8,152,607 B2 | 4/2012 | Carrig | |
| 8,166,712 B2 | 5/2012 | Contreras | |
| 8,297,000 B1 | 10/2012 | Demartini | |
| 8,438,787 B2 | 5/2013 | Lenney et al. | |
| 8,459,712 B2 * | 6/2013 | Thrasher | B25B 31/00 248/219.2 |
| 8,528,695 B1 * | 9/2013 | Orpia | E06C 7/48 182/206 |
| 9,033,349 B2 | 5/2015 | Graves et al. | |
| 9,174,781 B2 * | 11/2015 | Case | B29C 45/14565 |
| 9,359,139 B1 | 6/2016 | Faulkner | |
| 9,506,268 B1 | 11/2016 | Bright et al. | |
| 9,555,968 B2 | 1/2017 | Seaton | |
| 9,642,315 B2 | 5/2017 | Lloyd | |
| 9,689,166 B2 | 6/2017 | Nelson | |
| 9,702,503 B2 * | 7/2017 | Chi Man | B05B 15/62 |
| 9,963,882 B2 | 5/2018 | Daneau | |
| 10,017,990 B2 * | 7/2018 | Charlton | E06C 7/486 |
| 10,174,505 B1 | 1/2019 | Hicks et al. | |
| D880,008 S * | 3/2020 | Adams | E06C 7/486 D25/68 |
| D882,120 S * | 4/2020 | Adams | E06C 1/34 D25/68 |
| 10,669,722 B1 | 6/2020 | Hicks et al. | |
| 2003/0183450 A1 * | 10/2003 | Bonafide | E06C 7/486 182/107 |
| 2004/0055820 A1 * | 3/2004 | Charlton | E06C 7/486 182/107 |
| 2004/0159760 A1 * | 8/2004 | Olive | A01G 9/128 248/317 |
| 2005/0016076 A1 | 1/2005 | Spradlin | |
| 2005/0045421 A1 * | 3/2005 | Gaines | E06C 7/482 182/107 |
| 2006/0130410 A1 | 6/2006 | Isisaki | |
| 2008/0010906 A1 | 1/2008 | Brochu | |
| 2008/0128030 A1 | 6/2008 | Lewis | |
| 2009/0014240 A1 * | 1/2009 | Salisbury | E04D 13/0725 182/129 |
| 2009/0178886 A1 * | 7/2009 | Joyner | E06C 7/188 182/206 |
| 2009/0242327 A1 * | 10/2009 | Tracy | E06C 7/486 182/107 |
| 2009/0277720 A1 * | 11/2009 | Henderson | E06C 7/48 182/214 |
| 2010/0024325 A1 | 2/2010 | Robbins et al. | |
| 2010/0116589 A1 * | 5/2010 | Mathieson | E06C 7/486 182/107 |
| 2010/0219017 A1 * | 9/2010 | Inman | E06C 7/46 182/129 |
| 2010/0287846 A1 | 11/2010 | Lenney | |
| 2011/0042536 A1 * | 2/2011 | Phillips | F16M 13/022 248/299.1 |
| 2012/0091116 A1 | 4/2012 | Casey | |
| 2012/0144759 A1 | 6/2012 | Higginbotham et al. | |
| 2013/0025969 A1 * | 1/2013 | Horn | E06C 7/48 182/8 |
| 2013/0099076 A1 * | 4/2013 | Mickelson | F16B 2/241 248/304 |
| 2013/0233993 A1 * | 9/2013 | Striepling | E06C 7/188 248/309.1 |
| 2013/0239388 A1 * | 9/2013 | Striepling | E06C 7/188 29/428 |
| 2014/0166397 A1 * | 6/2014 | Reynolds | E06C 7/188 29/428 |
| 2014/0367197 A1 * | 12/2014 | Mathieson | E04D 13/076 182/214 |
| 2015/0259982 A1 * | 9/2015 | Maragliano | E06C 7/505 29/525.01 |
| 2017/0198523 A1 * | 7/2017 | Klein | E06C 7/423 |
| 2017/0305602 A1 * | 10/2017 | Mittag | E06C 7/14 |
| 2018/0128050 A1 * | 5/2018 | St. Godard | E06C 7/48 |
| 2018/0274295 A1 * | 9/2018 | Adams | E06C 7/48 |
| 2019/0010705 A1 * | 1/2019 | Mongelluzzo | E04D 13/0765 |
| 2019/0378439 A1 * | 12/2019 | Debroux-Vincil | G09F 7/08 |

FOREIGN PATENT DOCUMENTS

| | | | | |
|---|---|---|---|---|
| CA | 3110675 A1 * | 9/2021 | | E06C 1/34 |
| DE | 4110717 C1 * | 8/1992 | | E06C 1/34 |
| DE | 20003341 U1 * | 6/2000 | | E06C 1/34 |
| DE | 102014205007 A1 * | 10/2014 | | E06C 1/12 |
| DE | 202016004881 U1 * | 10/2016 | | E06C 7/188 |
| DE | 202016105649 U1 * | 12/2016 | | E06C 7/188 |
| EP | 3130743 A1 * | 2/2017 | | E06C 7/48 |
| FR | 2430513 A1 * | 2/1980 | | E06C 7/486 |
| GB | 2423777 A | 9/2006 | | |
| GB | 2593483 A * | 9/2021 | | E06C 7/486 |

* cited by examiner

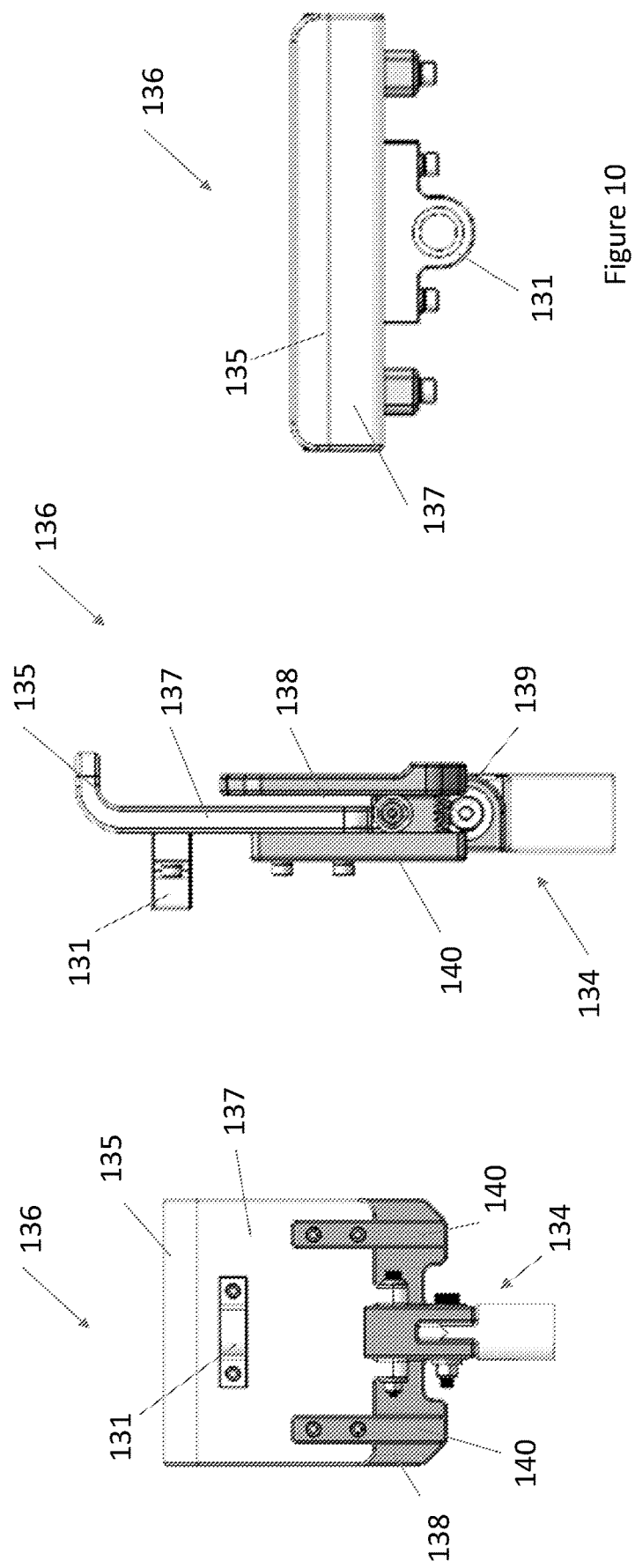

LADDER SECURING DEVICE

CROSS-REFERENCE TO RELATED APPLICATIONS

This application makes no priority claim.

TECHNICAL FIELD

Exemplary embodiments relate generally to systems and methods for securing a ladder to a gutter.

BACKGROUND AND SUMMARY OF THE INVENTION

Homeowners, contractors, workers, and other individuals are often required to access the roof and/or gutters of a home or other building. Roof access may be needed for roofing work, to clear debris from the roof or gutters, inspection, or the like. To access a roof or gutters, individuals often times lean a ladder up against the gutters of a building. However, gutters are relatively smooth surfaces and the forces caused by a person moving up or down a ladder or working and/or external forces, such as but not limited to wind or rain, may cause the ladder to slip, resulting in injury to the individuals or damage to the property. Some workplace policies, regulations, laws, or other rules may require or encourage the users of a ladder to tie or otherwise secure the ladder to the roof or gutters. This sometimes involves taking a spare piece of rope and tying the ladder to the gutter or other portion of the building. However, this effort is time consuming and also requires particular skills, such as but not limited to, knowledge of ropes, knots, safe tie off points, and the like. Furthermore, there is not always a structurally sound location or object to secure the ladder to. Therefore, what is needed are systems and methods for securing ladders to gutters.

Systems and methods for securing ladders to gutters are provided. An insert may be configured for securement to a gutter. The insert may be configured to be secured within the gutter. One or more flexible arms may extend from the insert. The flexible arms may be deformable such that the flexible arms may be temporarily secured in any of a number of positions. Such positions may include a first position where said arms extend from said insert in a substantially linear fashion and a second position wherein said arms are formed into full or partial circular shapes. The arms may be placed in the first position when a ladder is ready to be moved to or from the gutter. The arms may be placed in the second position around one or more portions of the ladder to secure the ladder to the insert, and thus the gutter, and thus the building. The insert may be configured to transfer forces, such as but not limited to lateral forces, from the ladder to the facia. In this way, the insert may also protect the gutters from deformation that may be caused by leaning the ladder against the gutter.

A mounting device may be provided. The mounting device may be configured to allow the insert to be installed to the gutter from the ground. The mounting device may comprise a pole and an attachment device. The pole may be any shape and length and may be collapsible. The attachment device may be configured for selective attachment to the insert. The attachment device may form a clamp configured to fit a portion of the insert. The insert may be attached to the attachment device and placed within the gutter. In exemplary embodiments, the insert may be placed in a vertical position just above the gutter and subsequently rocked forward into the gutter. The attachment device may be removed by downward force on the pole, thereby removing the attachment device from the insert. The ladder may be positioned against the insert. The arms may comprise posts, which are not deformable, and provide some protection against movement of the ladder when the arms are placed in the first position. The user may place the arms in the second position, preferably around the side rails of the ladder to secure the ladder to the gutter.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8 is a front view of the attachment device of FIG. 7;

FIG. 9 is a right side view of the attachment device of FIG. 7;

FIG. 10 is a top view of the attachment device of FIG. 7;

DETAILED DESCRIPTION OF EXEMPLARY EMBODIMENT(S)

Figure 1:
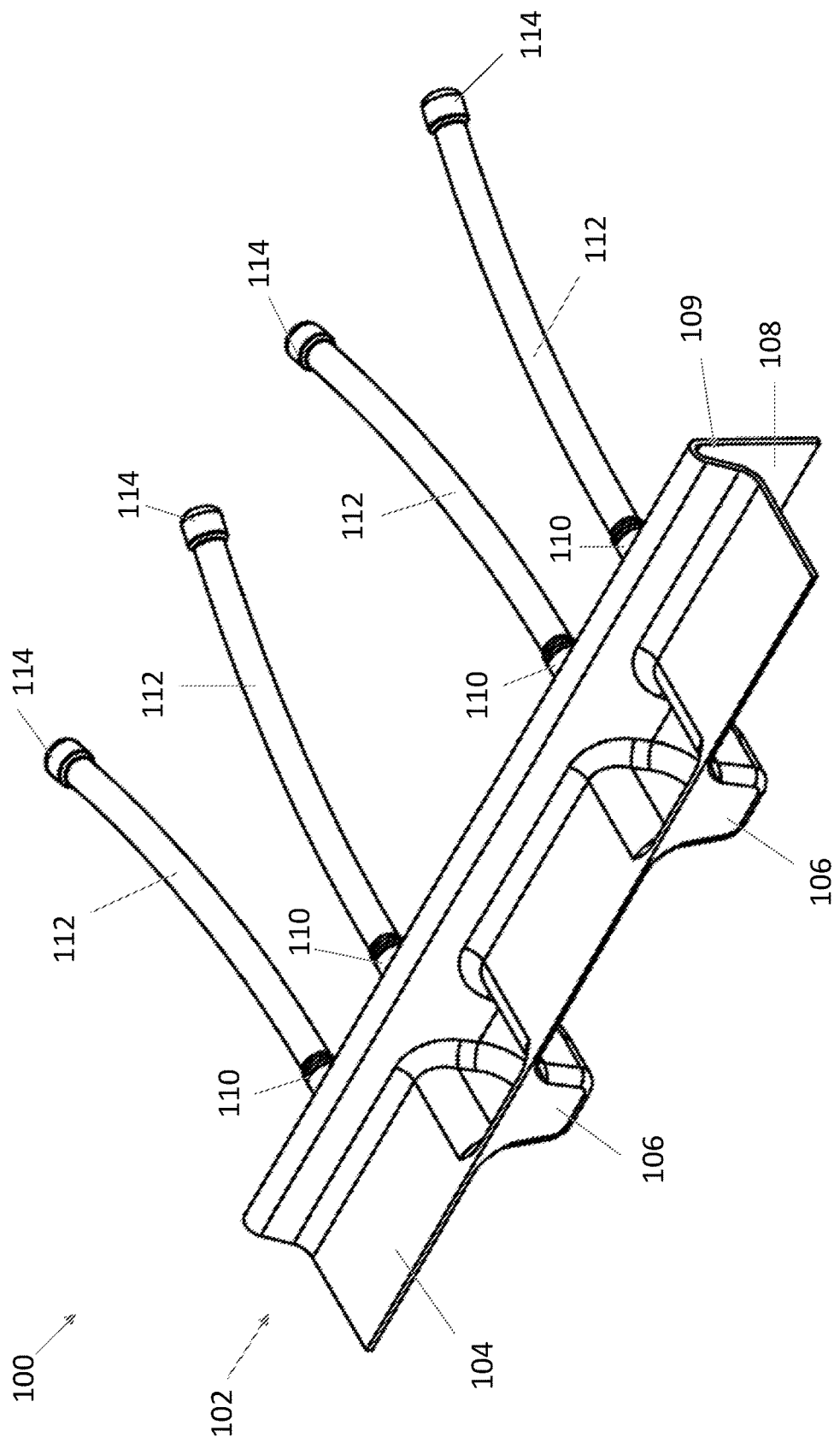
FIG. 1 is a perspective view of an insert for a ladder securing system in accordance with the present invention with the arms in a first position.
Figure 2:
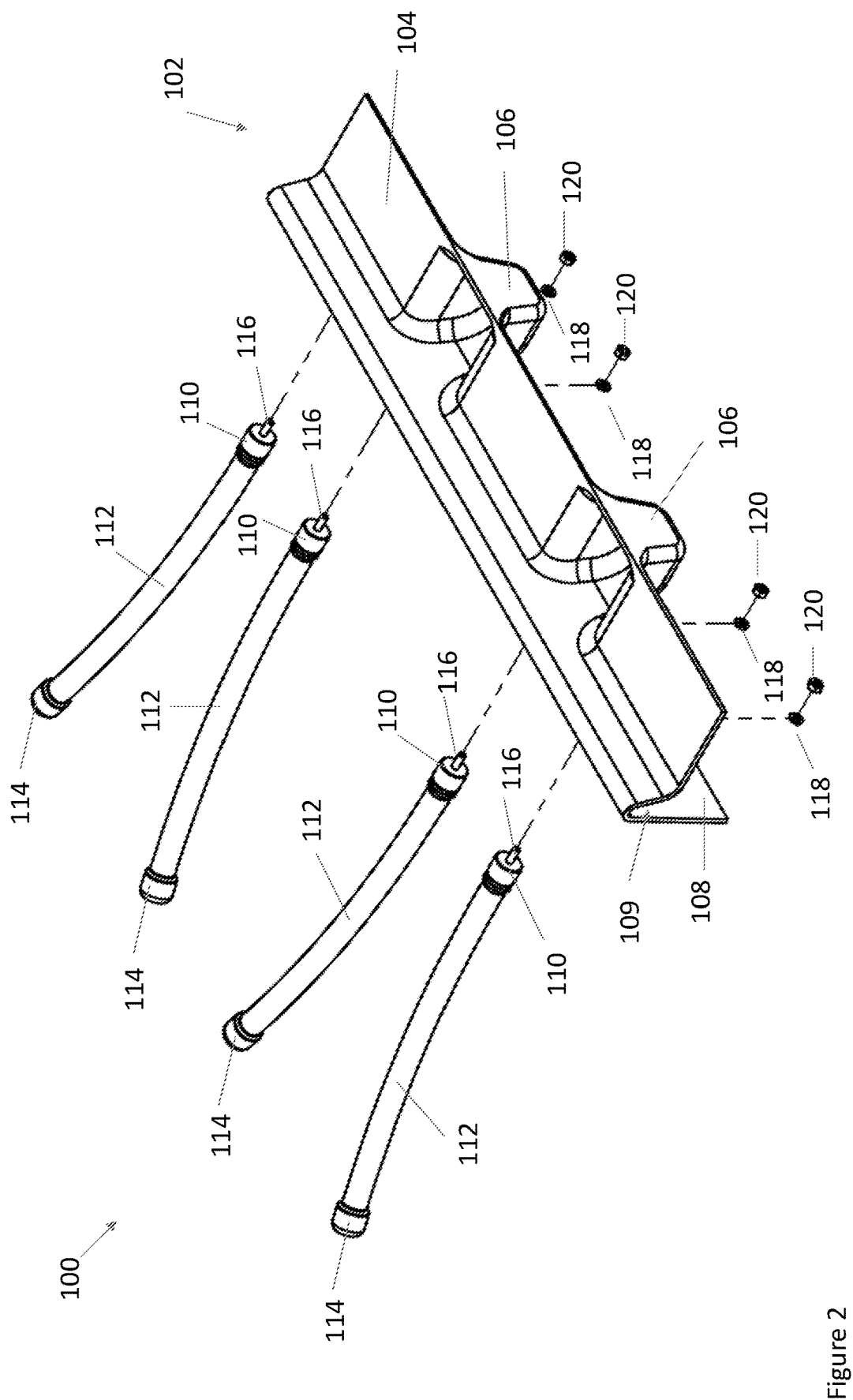
FIG. 2 is an exploded view of the device of FIG. 1.
Figure 3:
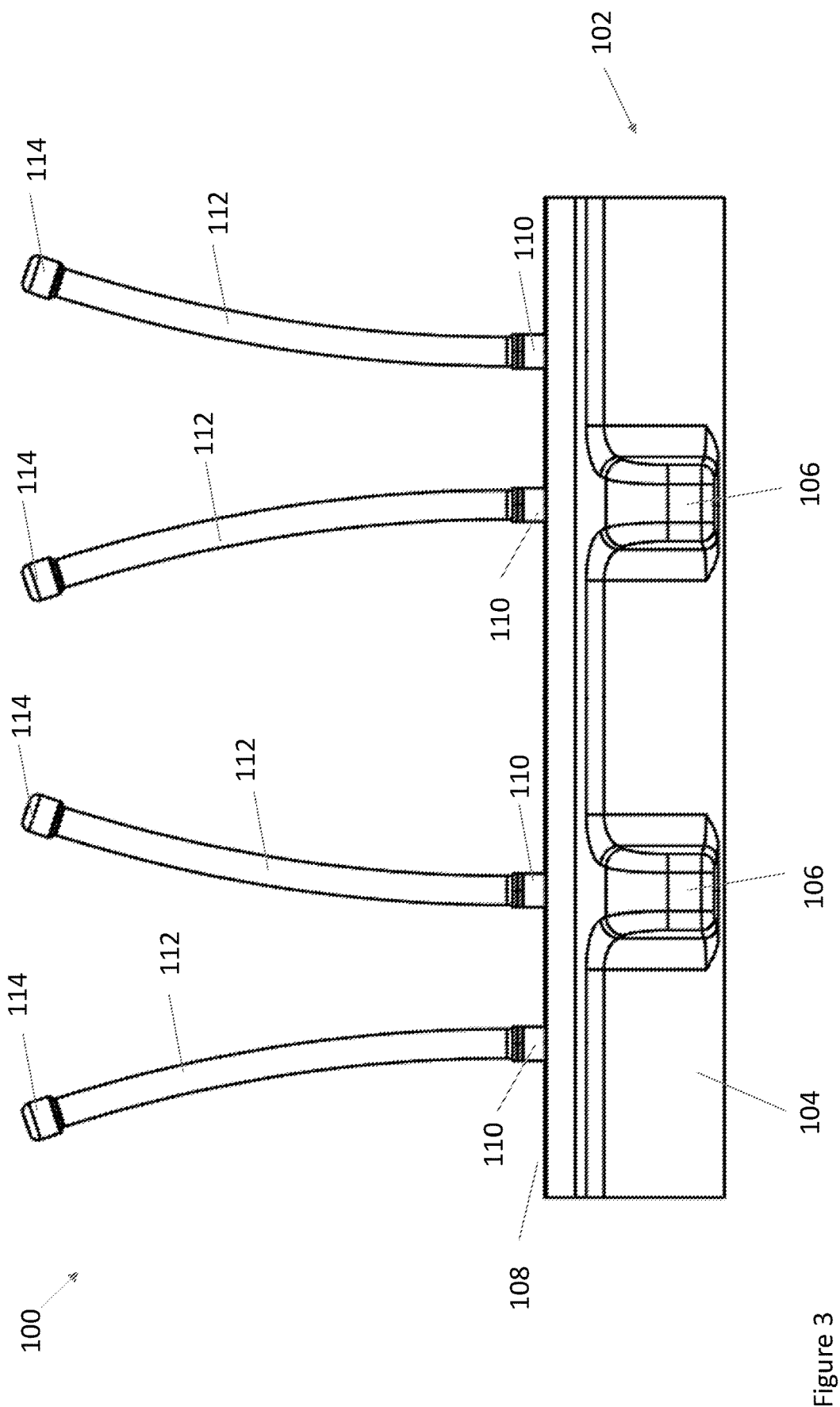
FIG. 3 is a top view of the device of FIG. 1.
Figure 4:
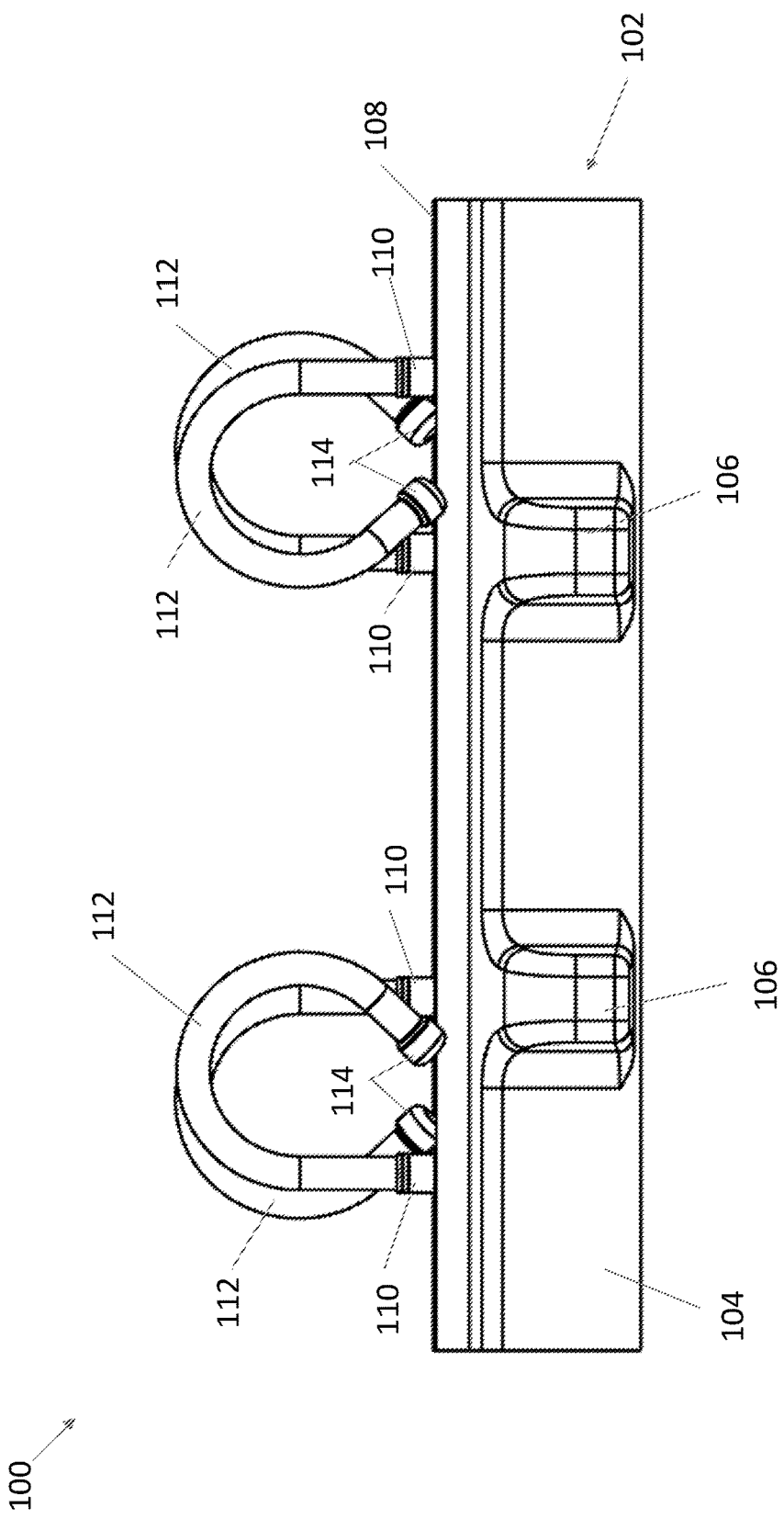
FIG. 4 is a top view of the device of FIG. 1 with the arms in a second position.
Figure 5:
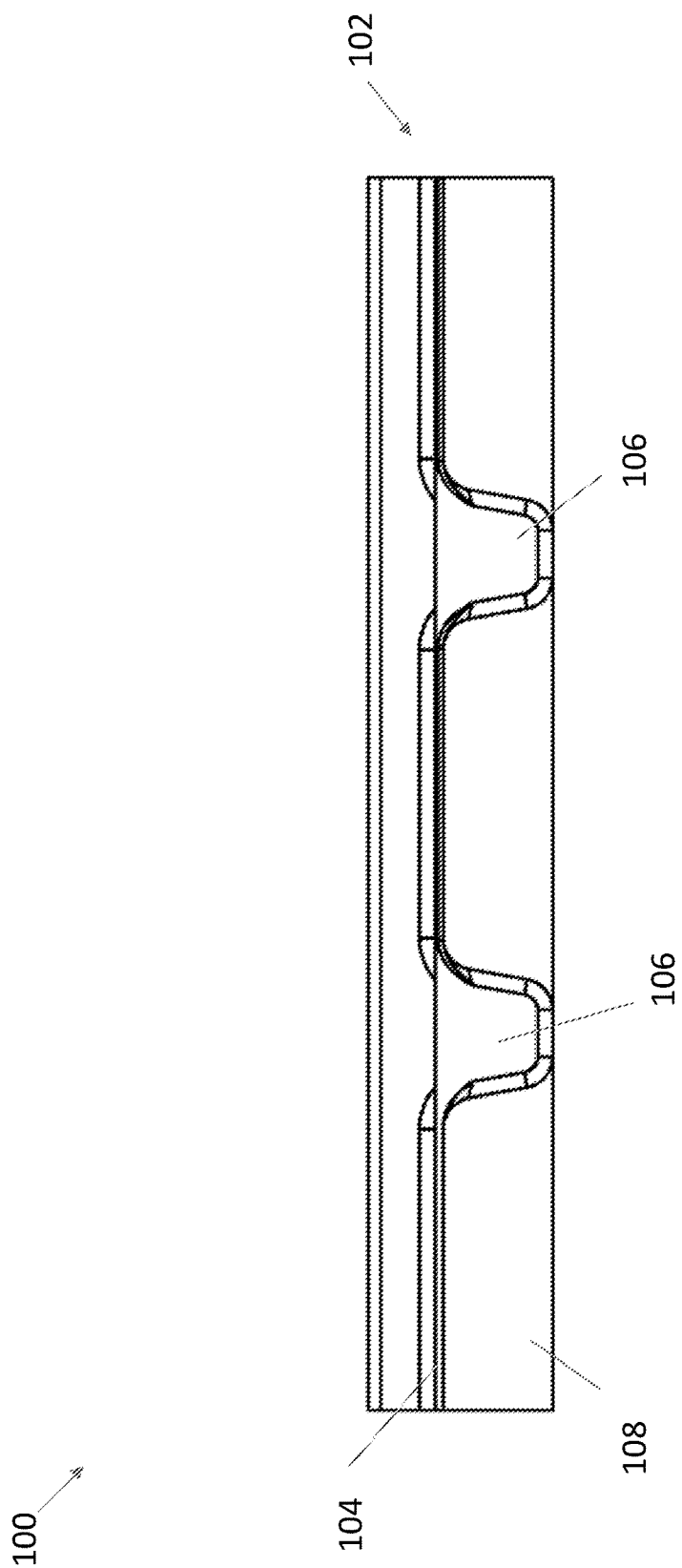
FIG. 5 is a front view of the device of FIG. 1.
Figure 6:
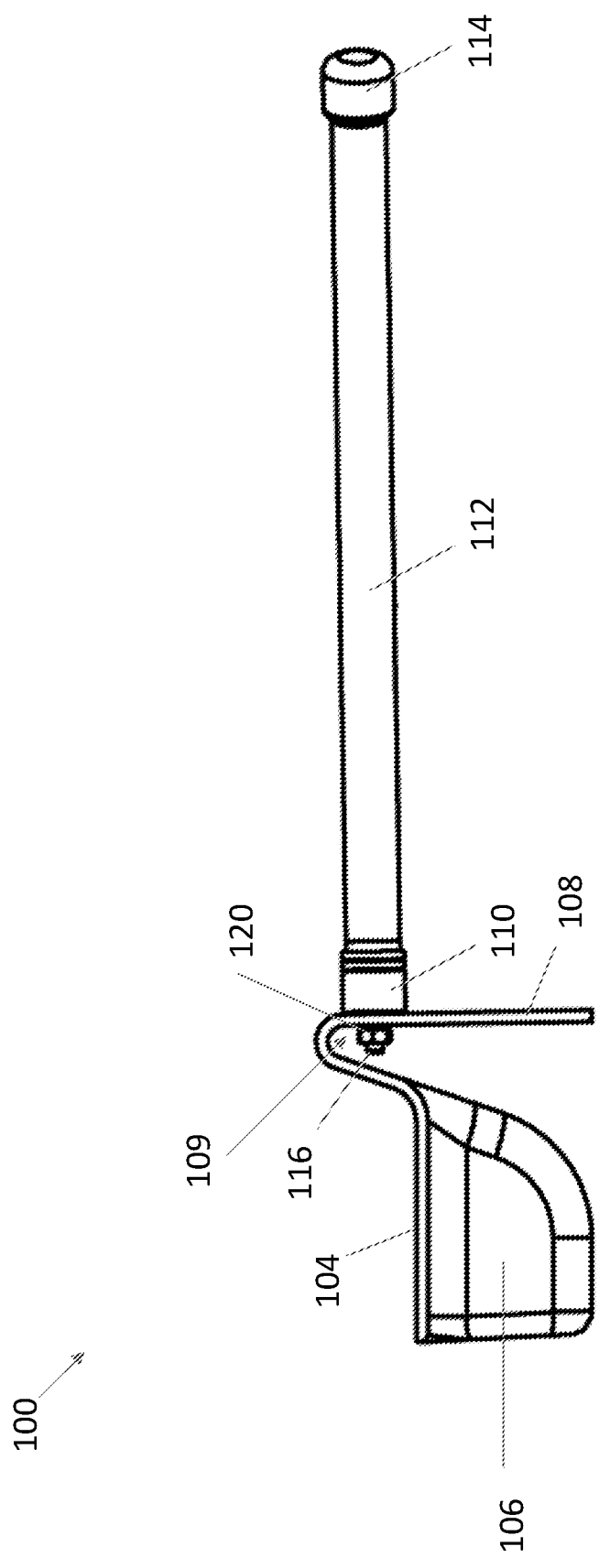
FIG. 6 is a side view of the device of FIG. 1.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 6 illustrate an insert 102 of a ladder securing system 100. The insert 102 may be configured for securement to a gutter 144. The insert 102 may comprise a first portion 104 configured to fit within or atop the gutter 144. In exemplary embodiments, the first portion 104 may comprise a flat surface configured to substantially cover the opening to the gutter 144. Such covering may be achieved by sizing the first portion 104 to extend between or atop the front and rear surfaces of the gutter 144. One or more depressions 106 may extend from the first portion 104. The depressions 106 may be configured to fit within the gutter 144. The depressions 106 may be spaced apart along the first portion 104 to fit between ferrules or other hangers securing the gutter 144 to the building 142. These depressions 106 may assist in transferring forces, such as but not limited to lateral forces, from the ladder 146 to the building 142, such as but not limited to, facia boards 141 of the building 142. The first portion 104 may assist in protecting the gutters 144 from debris that may become dislodged or otherwise removed while working on the building 142, such as but not limited to, roofing materials, masonry, brick, mortar, shingles, nails, screws, or the like. The depressions 106 may further be configured to collect at least some of this debris.

In exemplary embodiments, the insert 102 may be configured for lateral movement along the gutter 144. Ferrules or other hangers do not always have standardize spacing so the ability to laterally move the insert 102 may permit the insert 102 to be moved along the gutter 144 to a location where the depressions 106 may be accommodated. In exemplary embodiments, the first portion 104 may be configured to be secured above the ferrules or other hangers of the gutter 144.

A second portion 108 may extend from the first portion 104. The second portion 108 may be configured to extend over some or all of the front face of the gutter 144. In exemplary embodiments, the second portion 108 may initially extend upward from the first portion 104 and then extend downward so as to create a channel 109 which is configured to receive the front edge of the gutter 144. In exemplary embodiments, the insert 102 may be comprised of a polymer, a metal, some combination thereof, or the like, though any type of material is contemplated. The first and second portions 104 and 108, respectively, may be configured to snap fit to the gutter 144, though such is not required.

One or more flexible arms 112 may extend from the insert 102. In exemplary embodiments, the flexible arms 112 extend from the second portion 108, though any location is contemplated. In exemplary embodiments, four flexible arms 112 are provided to accommodate two side rails 148 of a ladder 146, though any number of flexible arms 112 are contemplated to accommodate any number and portion of ladders 146. The flexible arms 112 may be goosenecks. The flexible arms 112 may be deformable such that the flexible arms 112 may be temporarily secured in any of a number of positions. Stated another way, once the flexible arms 112 are moved, they may retain their current position absent external forces. However, the flexible arms 112 may be configured for movement into any number of positions. Such positions may include a first position where said arms 112 extend from said insert 102 in a substantially linear fashion. Said positions may include a second position where said arms 112 are formed into full or partial circular shapes which may be sized to accommodate the side rails 148 or other portions of the ladder 146.

The arms 112 may be placed in the first position when the ladder 146 is ready to be moved to or from the gutter 144. The arms 112 may be placed in the second position, preferably around one or more side rails 148 of the ladder 146 to secure the ladder 146 to the insert 102, and thus the gutter 144, and thus the building 142. The insert 102, and particularly the depressions 106, may be configured to transfer forces, such as but not limited to lateral forces, from the ladder 146 to facia boards or other structural members of the building 142 when the ladder 146 is secured to the insert 102. In this way, the insert 102 may also protect the gutters 144 from deformation, bending, scratching, or the like.

The arms 112 may be attached to the second portion 108, or other portion of the insert 102, by way of connectors 110. Each of the connectors 110 may be configured to fit about a first end of one of the arms 112. In exemplary embodiments, each of the arms 112 may include a threaded portion configured to be attached to a threaded portion on the connectors 110 to secure the connectors 110 to the arms 112. However, other means of attachment are contemplated such as integral formation, welding, adhesive, bonding, fasteners, snap fit, press fit, frictional fitting, some combination thereof, or the like.

The connectors 110 may comprise protrusions 116. The protrusions 116 may configured for extension through apertures in the second portion 108, or another portion of the insert 102. One or more fasteners 118, 120 may be connected to the protrusions 116 to secure the connectors 110, and thus the arms 112, to the insert 102. The fasteners 118, 120 may include washers 118, such as but not limited to split lock washers, and nuts 120. The protrusions 116 may be comprise threaded portions configured to receive the nuts 120 and the washers 118. However, other means of attachment are contemplated such as integral formation, welding, adhesive, bonding, fasteners, snap fit, press fit, frictional fitting, some combination thereof, or the like.

The caps 114 may be configured to fit about a second end of the arms 112. The caps 114 may be comprised of a rubber, a polymer, some combination thereof, or the like, though any material is contemplated. The arms 112 may be configured to receive the caps 114 by frictional fit. However, other means of attachment are contemplated such as integral formation, welding, adhesive, bonding, fasteners, snap fit, press fit, frictional fitting, some combination thereof, or the like.

Figure 7:
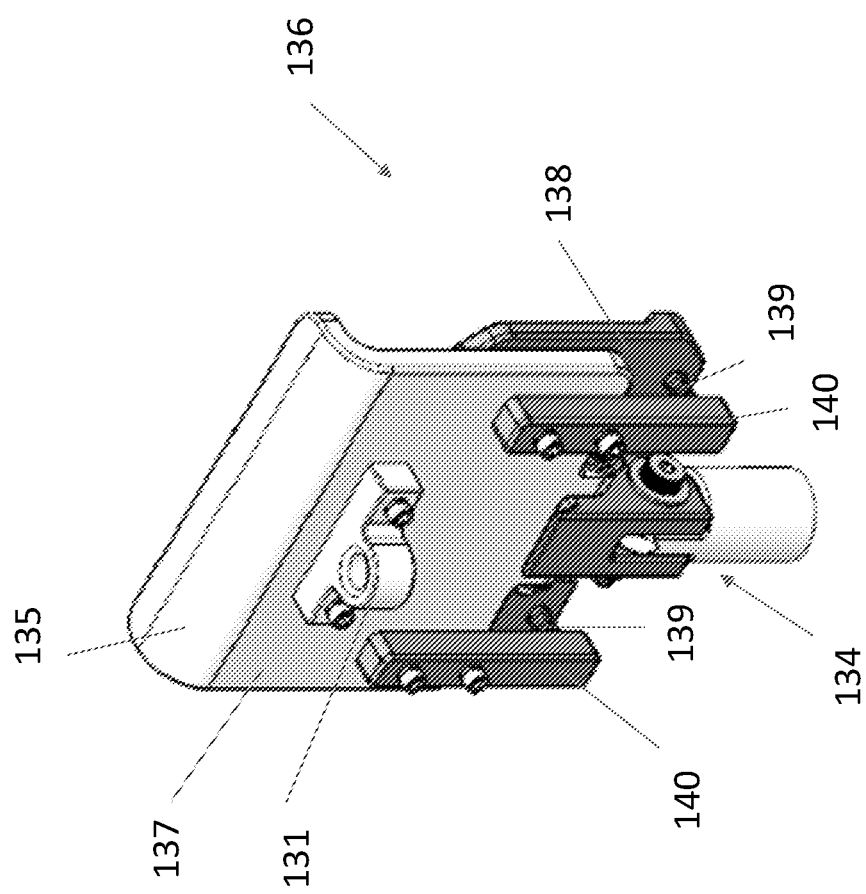
FIG. 7 is a perspective view of an attachment device of an exemplary mounting device for the ladder securing system in accordance with the present invention.
Figure 11:
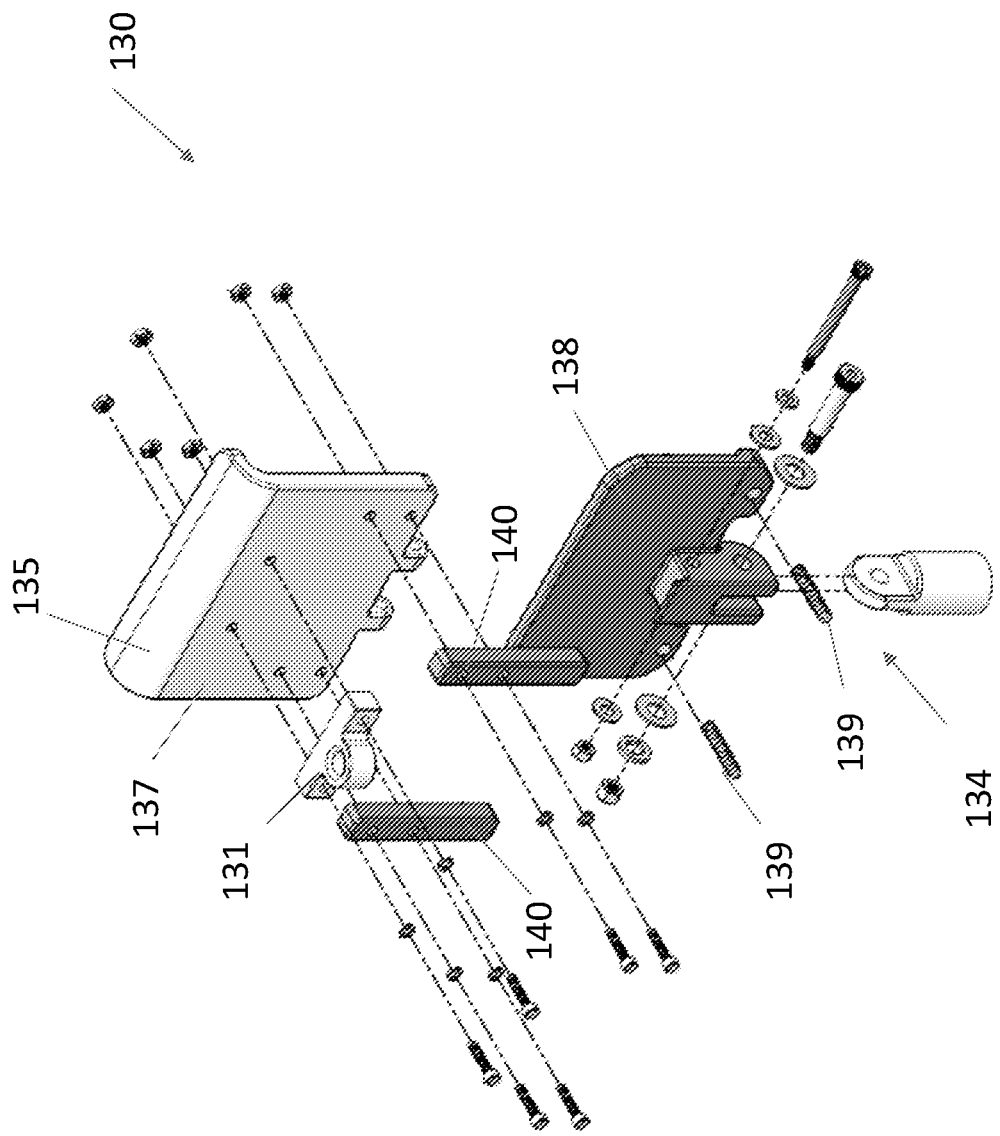
FIG. 11 is an exploded view of the attachment device of FIG. 7

FIG. 7 though FIG. 11 illustrate an exemplary attachment device 136 for an exemplary mounting device 130 for the ladder securing system 100. The mounting device 130 may be configured to permit installation of the insert 102 to the gutter 144 from the ground. In this way, the ladder 146 may be at least partially installed to the insert 102 from the ground.

The mounting device 130 may comprise a pole 132. The pole 132 may be any size or shape. In exemplary embodiments, the pole 132 may be capable of telescoping or otherwise expanding and collapsing to a variety of lengths.

The mounting device 130 may further comprise an attachment device 136. The attachment device 136 may be selectively attached to the pole 132, such as by screwing the attachment device 136 onto a threaded portion of the pole 132, though any method of attachment, including permanent attachment or integral formation, is contemplated. In exemplary embodiments, the attachment device 136 may comprise a rotational device 134 configured to permit pivoting movement of the attachment device 136 relative to the pole 132, though other rotational movements are contemplated.

The attachment device 136 may be configured for selective attachment to the insert 102. The attachment device 136 may form a clamp configured for selective attachment to the insert 102. In exemplary embodiments, the attachment device 136 may comprise a first surface 137 and a second surface 138. The first surface 137 and the second surface 138 may be attached to the rotational device 134, which may be attached to the pole 132. The first surface 137 and/or the second surface 138 may comprise a grippy material, such as but not limited to a rubberized material, configured to grip the insert 102. The first surface 137 may comprise a curved portion 135. The curved portion 135 may be located at an upper portion of the first surface 137. The curved portion 135 may be configured to wrap over an edge of the liner 102 to assist in securing the attachment device 136 to the liner.

One or more members 140 may extend from the first surface 137 and/or the second surface 138. One or more springs 139 may extend between the members 140 and the opposing one of the first and second surfaces 137 or 138, respectively. The springs 139 may bias the first surface 137 and/or the second surface 139 in a closed position such that distal ends of the first surface 137 and/or the second surface 139 are biased towards one another in a clamped position, though the reverse is contemplated.

The first surface 137 may extend higher than the second surface 138, though and size and shape first surface 137 and second surface 138 are contemplated. One or more fasteners, washers, nuts, pins, some combination thereof, or the like, may be utilized to secure various components of the attachment device 136 to one another. Alternatively, or additionally, permanent securement such as but not limited bonding, welding, adhesive, integral formation, some combination thereof, or the like, is contemplated.

Figure 12:
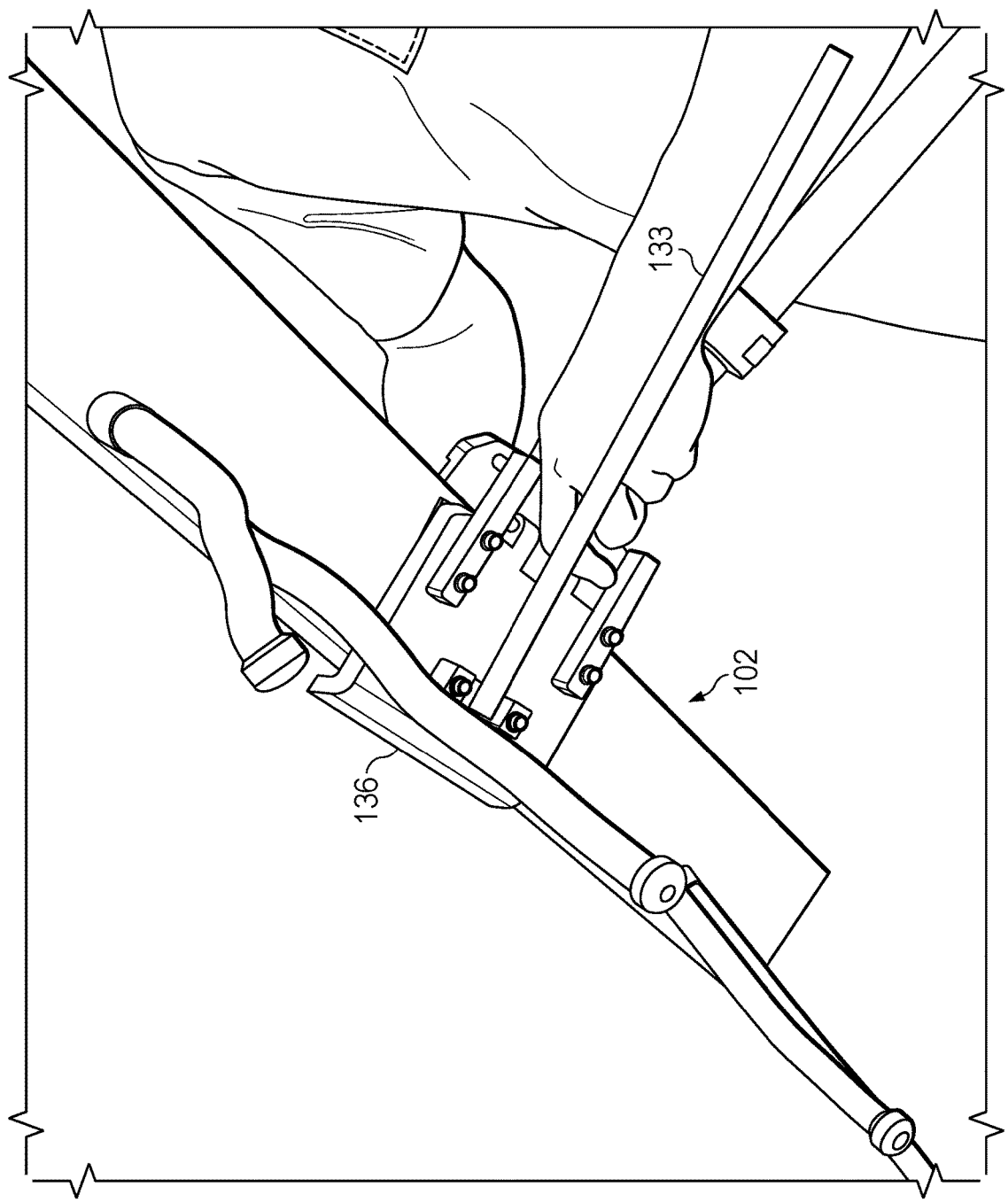
FIG. 12 is a perspective view of the attachment device of FIG. 7 secured to the insert of FIG. 1.
Figure 13:
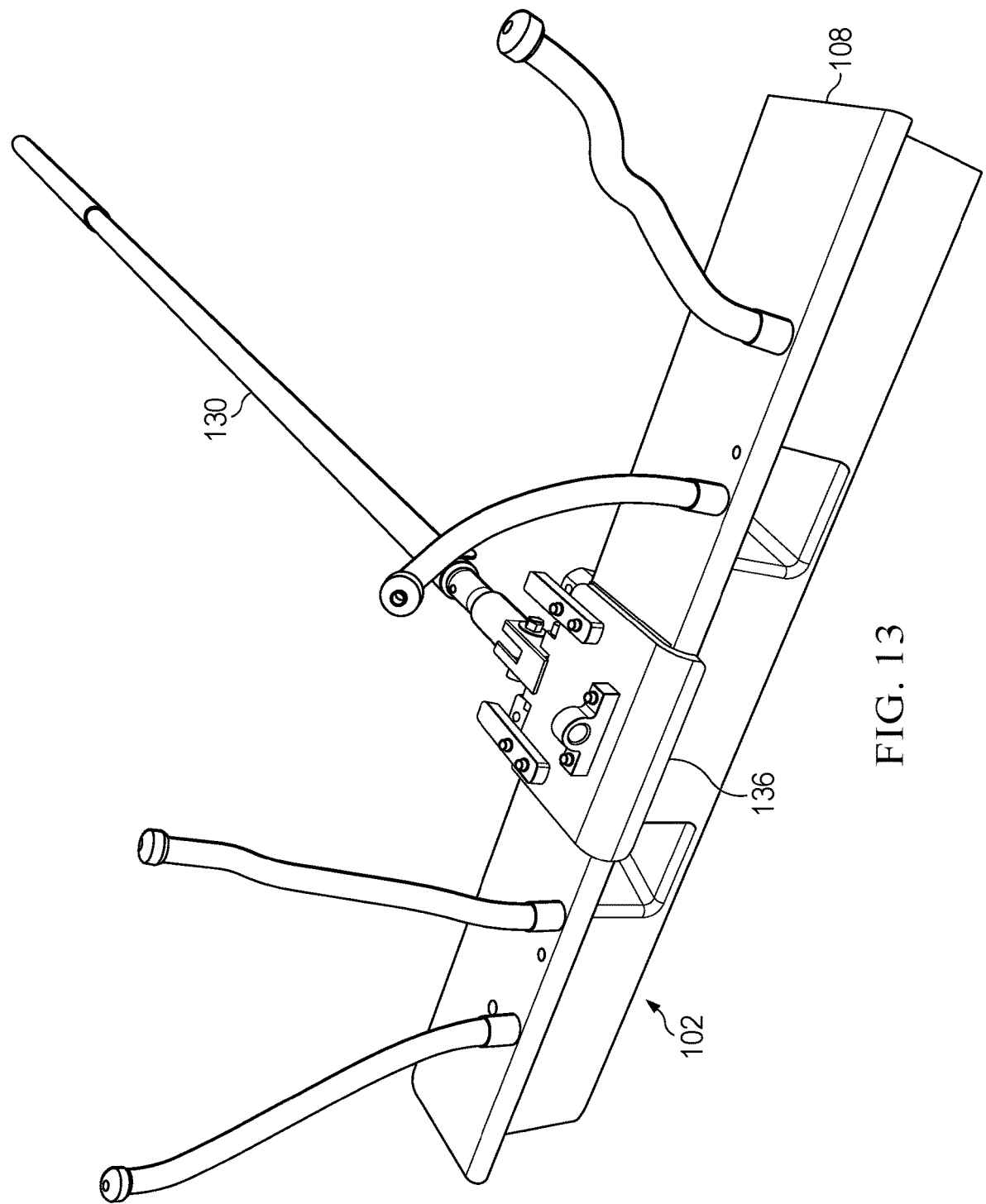
FIG. 13 is another perspective view of the mounting device connected to the insert.
Figure 14:
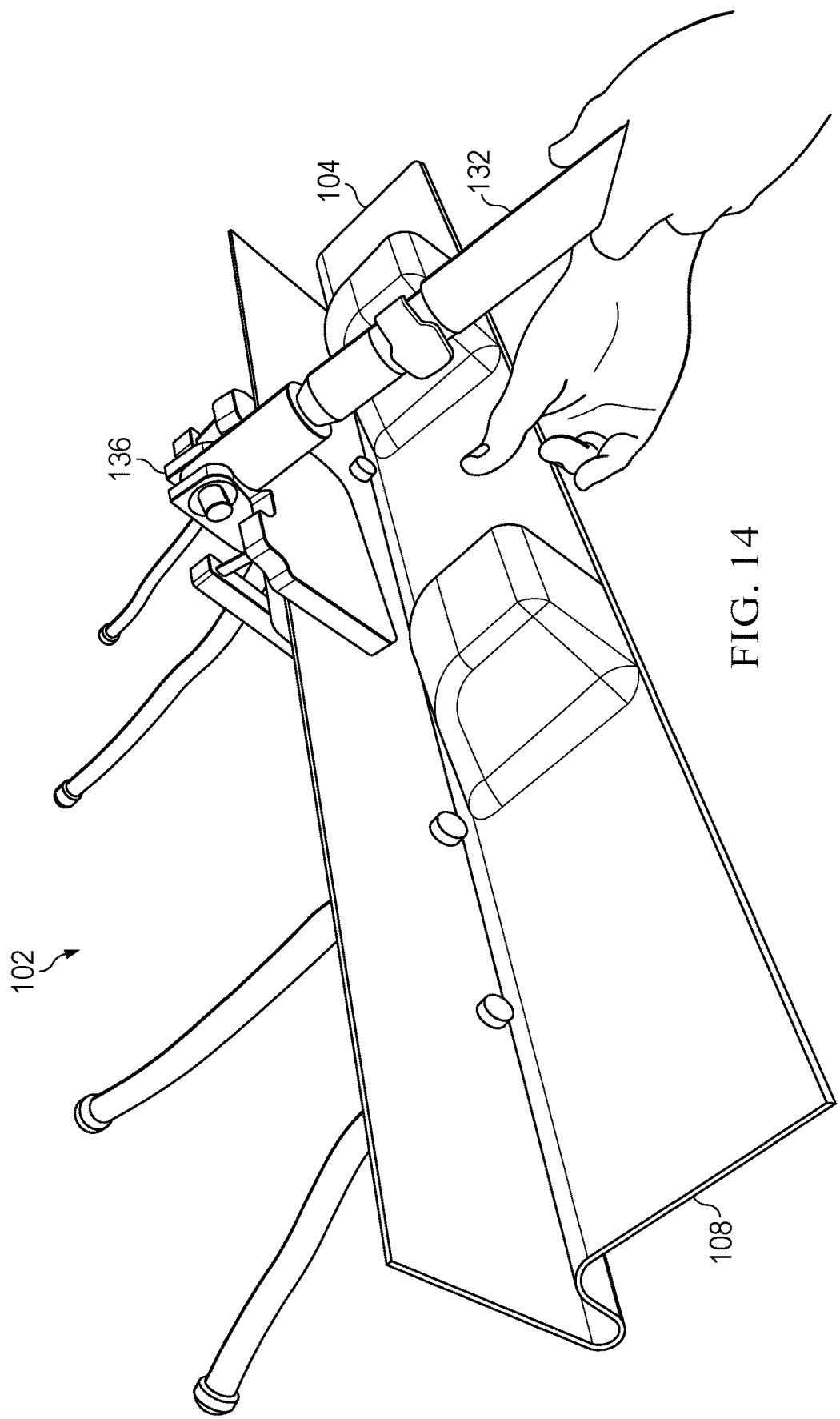
FIG. 14 is another perspective view of the mounting device connected to the insert.

FIG. 12 through FIG. 14 illustrate the attachment device 136 attached to the insert 102. In exemplary embodiments, the second portion 108 of the inset 102 may be secured between the first surface 137 and the second surface 139 of the attachment device 136 such that the attachment device 136 clamps the insert 102. As shown with particular regard to FIG. 14, the attachment device 136 may be rotated, by way of the rotational device 134 to a position substantially perpendicular to the pole 132.

A cord 133 may be attached to the attachment device 136. In exemplary embodiments, the cord 133 may be attached to a receiver 131. The receiver 131 may be attached to the first surface 137 and/or the second surface 138 of the attachment device 136, though any location is contemplated. The receiver 131 may comprise a hole, loop, hook, or other device configured to receive the cord 133.

The cord 133 may comprise a string, rope, wire, some combination thereof, or the like. The cord 133 may be any size, shape, and length. In exemplary embodiments, the cord 133 may extend substantially the length of the pole 132. The cord 133 may be affixed to the attachment device 136 in such that pulling on the cord 133 forces the attachment device 136 into an opened position and/or facilitates removal of the attachment device 136 from the insert 102. In exemplary embodiments, the cord 133 may be attached to the first surface 137 and/or the second surface 138 of the attachment device 136, though any location is contemplated.

Figure 15:
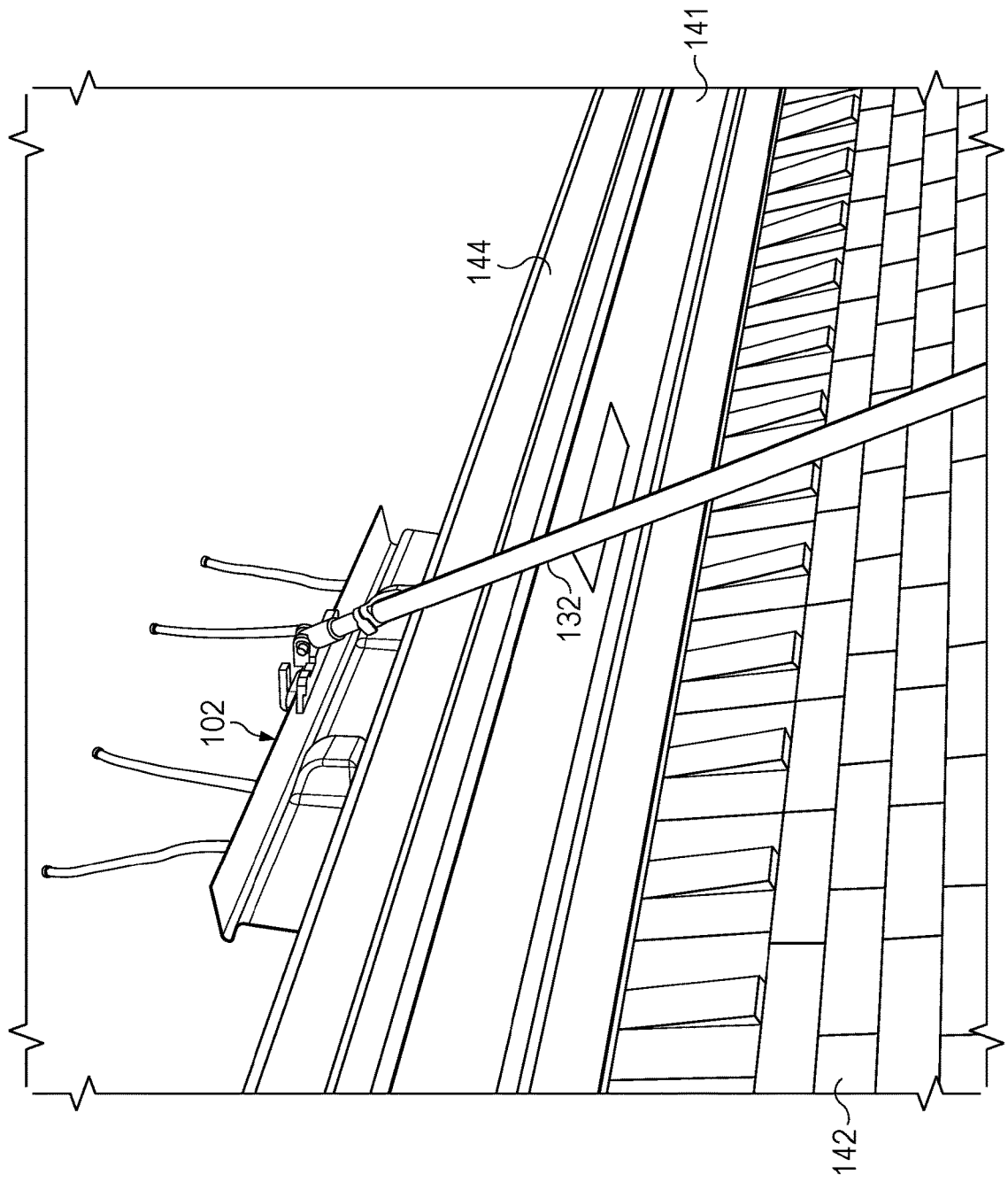
FIG. 15 is a perspective view of the ladder securing device in the process of being secured to a gutter of a building.
Figure 16:
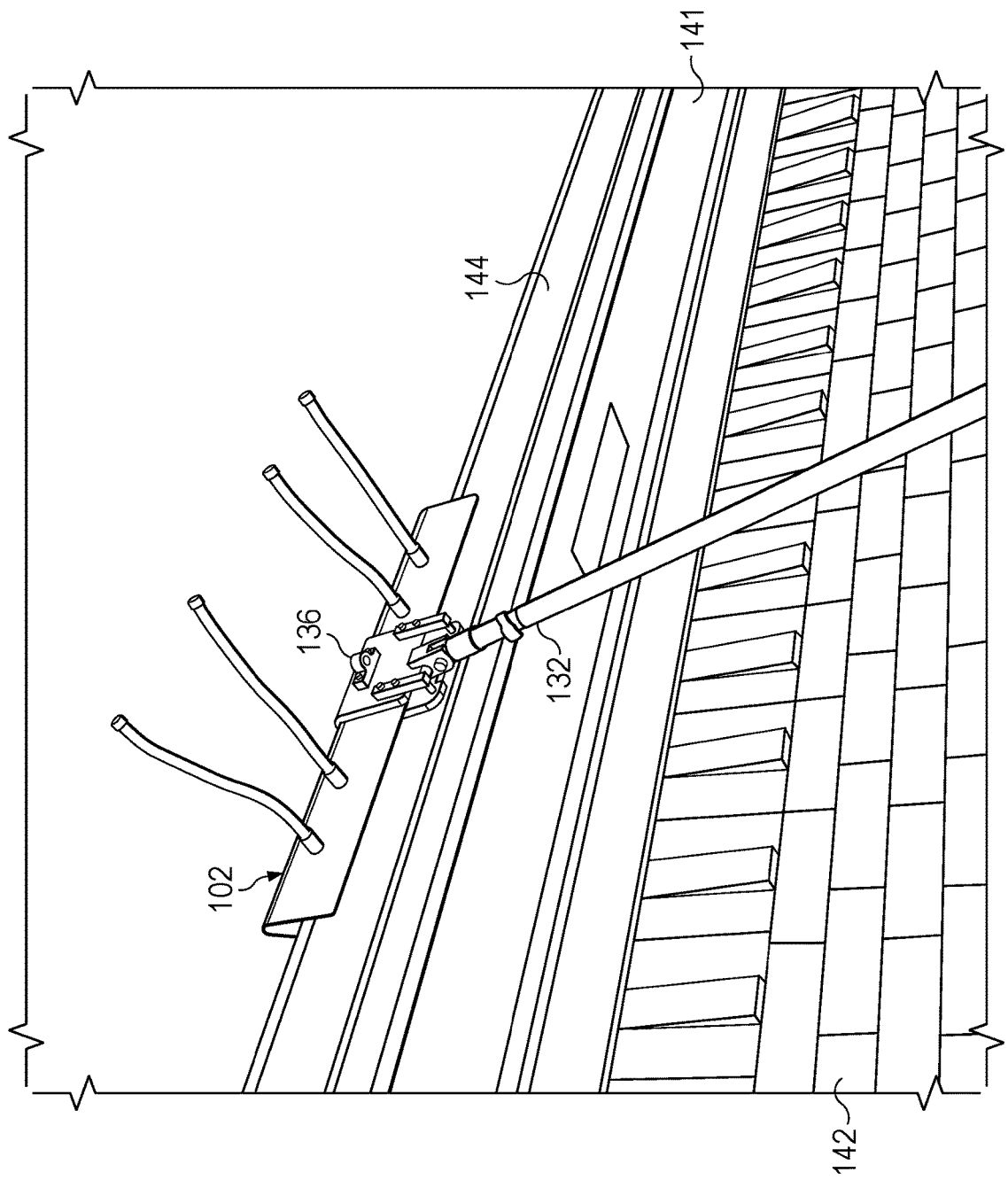
FIG. 16 is another perspective view of the ladder securing device in the process of being secured to the gutter of the building.

FIG. 15 through FIG. 16 illustrate the insert 102 being secured within the gutter 114. The insert 102 may be raised, by way of the pole 132, to by placed within the gutter 144. In exemplary embodiments, a free end of the first portion 104 of the insert 102 may secured under the edge of a roof 143 or to a rear edge of the gutter 114. The insert 102 may be rocked forward, such as by downward and/or forward pull on the pole 132, to be secured to the gutter 144. Once the insert 102 is secured within the gutter 144, the mounting device 130 may be removed. The mounting device 130 may be removed, for example without limitation, by downward pulling force on the pole 132, which may allow the attachment device 136 to slide downward from the second portion 108 of the insert 102, thereby separating the mounting device 130 from the insert 102 and leaving the insert 102 secured to the gutter 144.

Figure 17:
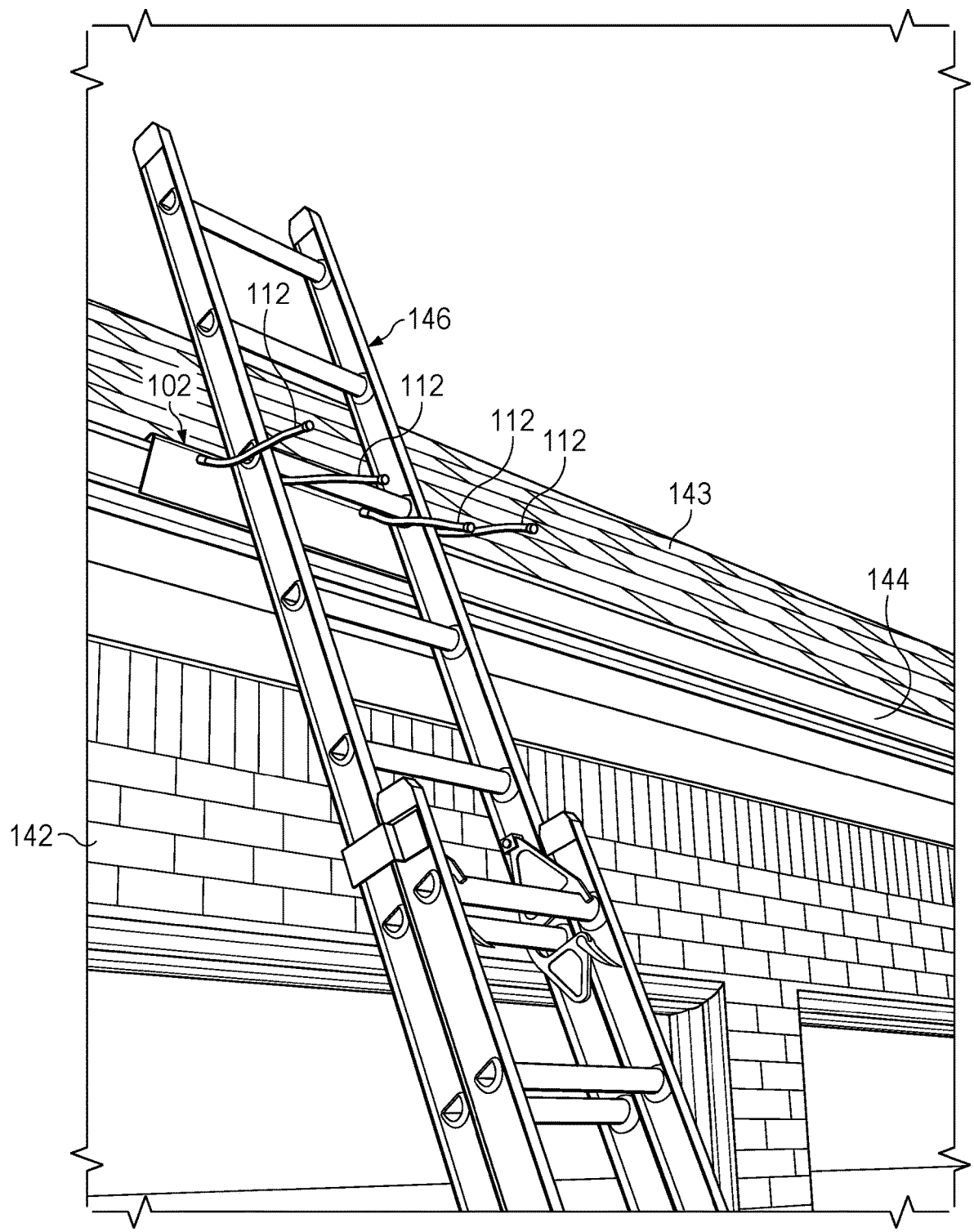
FIG. 17 is a perspective view of a ladder being secured to the insert.
Figure 18:
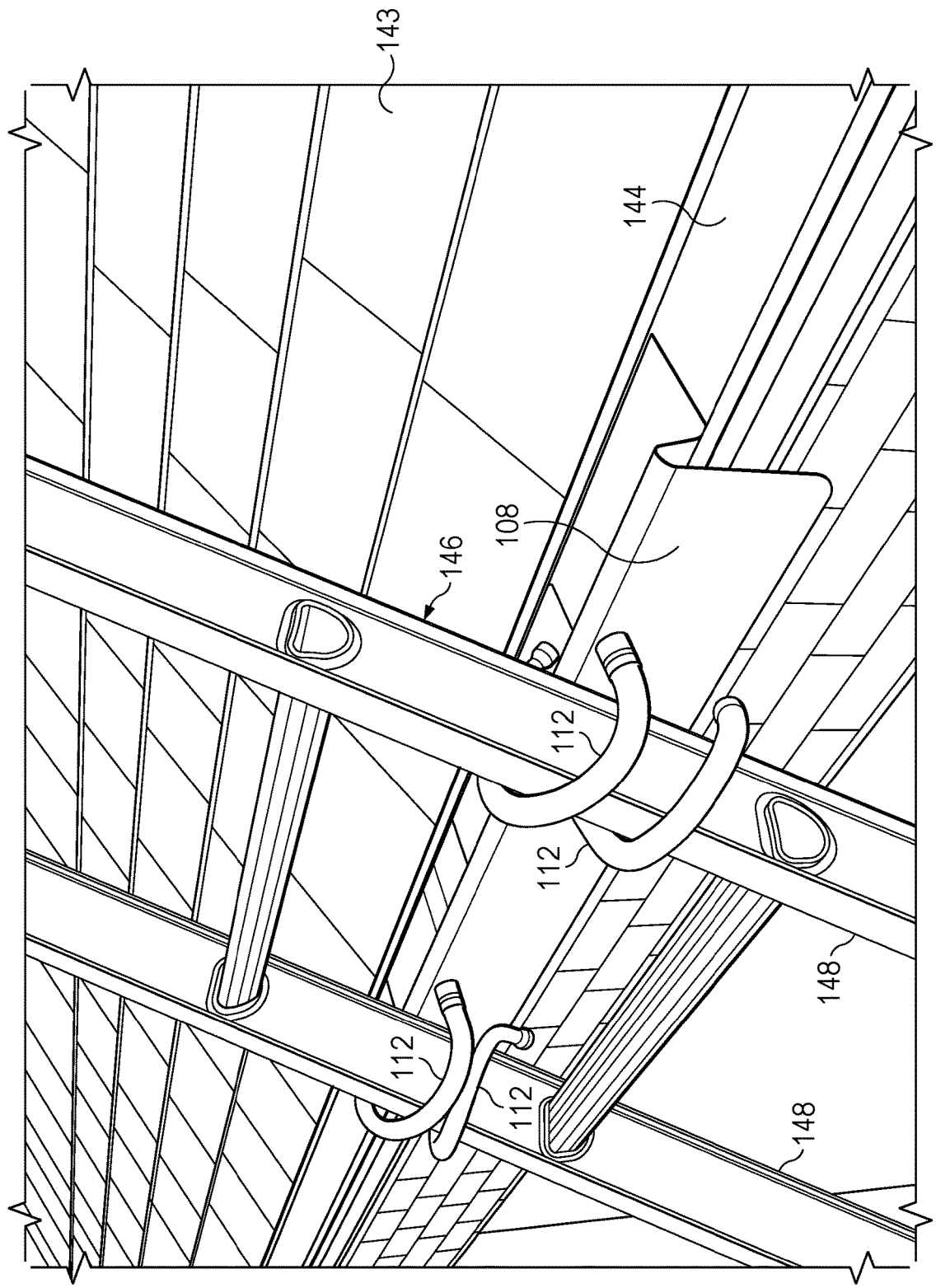
FIG. 18 is a detailed perspective view of the ladder secured to the insert.

FIG. 17 through FIG. 18 illustrate the ladder 146 being secured to the insert 102. The ladder 146 may be positioned against the insert 102. This may provide some protection against movement of the ladder 146. For example, without limitation, the connectors 110 may not be deformable. The connectors 110 may provide some lateral stability to the ladder 146. Regardless, the insert 102 may protect the gutters 144 as the ladder 146 is leaned against the gutters 144. The arms 112 may be placed in the second position, preferably around the side rails 148 of the ladder 146 to secure the ladder 146 to the gutter 144. The arms 112 may be placed in the second position by a user who climbs the ladder 146.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for securing a ladder to a gutter comprising:
   a first portion comprising an upper surface and one or more depressions extending from the upper surface that are configured to fit within an opening of the gutter;
   a second portion comprising a forward face, wherein the forward face and the first portion define, at least in part, a channel configured to receive a front surface of the gutter, and wherein the forward face is configured to extend in a direction of a longitudinal axis of, and spaced apart from, the gutter when installed; and
   arms extending from the forward face, wherein said arms are selectively deformable into various positions;
   wherein the first and second portions are configured to frictionally engage the gutter in a snap-fit, by way of said one or more depressions and said channel.

2. The apparatus of claim 1 wherein:
   said arms are configured for selective placement into at least a first position where the arms extend in a substantially linear fashion substantially outward from the forward face, and a second position where the arms form at least partial loops configured to receive side rails of the ladder.

3. The apparatus of claim 2 further comprising:
apertures spaced apart along the forward face; and
connectors, each attached to a first end of one of the arms, and comprising a protrusion extending through one of the apertures in the second portion.

4. The apparatus of claim 3 wherein:
the first end of each of the arms comprises a threaded portion mated with corresponding threads on each of the connectors.

5. The apparatus of claim 3 further comprising:
nuts, wherein each of said protrusions comprise a threaded portion configured to receive one of said nuts.

6. The apparatus of claim 3 further comprising:
end caps, wherein each of the end caps is configured for attachment to a second end of one of the arms.

7. The apparatus of claim 1 wherein:
said first portion is configured to extend between the front surface and a rear surface of the gutter.

8. The apparatus of claim 1 wherein:
the second portion extends vertically upwards and away from a front edge of the first portion and vertically downwards to form the channel and the forward face.

9. A system for securing a ladder to a gutter comprising:
an insert configured to be selectively secured within the gutter by snap-fit engagement, said insert comprising:
  a first portion comprising an upper surface configured to extend between a front surface and a rear surface of the gutter and depressions extending from the upper surface configured to fit within the gutter when the insert is secured within the gutter;
  a second portion extending from said first portion and comprising a forward face configured to extend vertically in front of, spaced apart from, and in a direction of a longitudinal axis of, the front surface of the gutter when the insert is secured within the gutter, wherein the forward face and the depressions of the first portion define, at least in part, a channel configured to receive the front surface of the gutter and at least partially facilitate said snap-fit engagement; and
  arms extending from the forward face, wherein said arms are selectively deformable into various positions including at least a first position where the arms extend in a substantially linear fashion outward from the forward face, and a second position where the arms form at least partial loops configured to receive side rails of the ladder; and
a mounting device configured for selective attachment to the insert, said mounting device comprising:
  a pole; and
  an attachment device configured to be selectively secured to the insert.

10. The system of claim 9 further comprising:
a rotational device pivotally connecting said attachment device to said pole.

11. The system of claim 10 wherein:
said attachment device comprises a first surface, a second surface, a plurality of members extending from the first surface, and a plurality of springs, wherein each spring extends between one of the plurality of members and the second surface to bias the attachment device in a clamped position.

12. The system of claim 11 wherein:
the first surface, the second surface, the plurality of springs, and the plurality of members of said attachment device form a clamp configured to selectively clamped onto the second portion of the insert.

13. The system of claim 12 further comprising:
a rubberized element located said first surface or said second surface and configured to grip the second portion of the insert.

14. The system of claim 9 wherein:
said pole is capable of telescoping.

15. The system of claim 9 further comprising:
apertures spaced apart along the forward face; and
connectors, each attached to a first end of one of the arms, and comprising a protrusion received through one of the apertures in the forward face, wherein the first end of each of the arms comprises a threaded portion mated with corresponding threads on each of the connectors; and
nuts, wherein each of said protrusions comprise a threaded portion configured to receive one of said nuts.

* * * * *

UNITED STATES PATENT AND TRADEMARK OFFICE
CERTIFICATE OF CORRECTION

| | |
|---|---|
| PATENT NO. | : 11,814,899 B2 |
| APPLICATION NO. | : 16/825698 |
| DATED | : November 14, 2023 |
| INVENTOR(S) | : Heath Hicks and Eric Mackintosh |

It is certified that error appears in the above-identified patent and that said Letters Patent is hereby corrected as shown below:

In the Specification

In Column 5, Line 46, please delete "inset" and insert -- insert --.

In the Claims

In Column 6, Claim 1, Line 63, please delete "g utter" and insert -- gutter --.

Signed and Sealed this
Twenty-third Day of January, 2024

*Katherine Kelly Vidal*

Katherine Kelly Vidal
*Director of the United States Patent and Trademark Office*